Aug. 4, 1953 S. SMITH 2,647,450
MOTOR-PROPELLED CULTIVATOR
Filed July 23, 1947 5 Sheets-Sheet 1
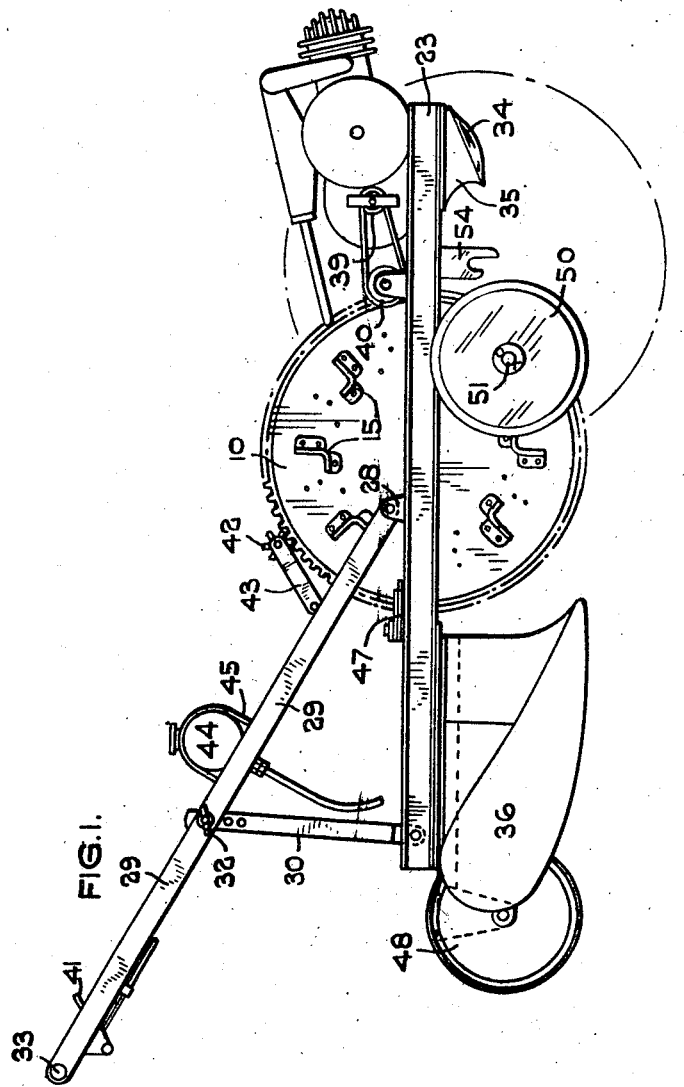
INVENTOR
Sydney Smith
BY Otto Munk
HIS ATTORNEY.

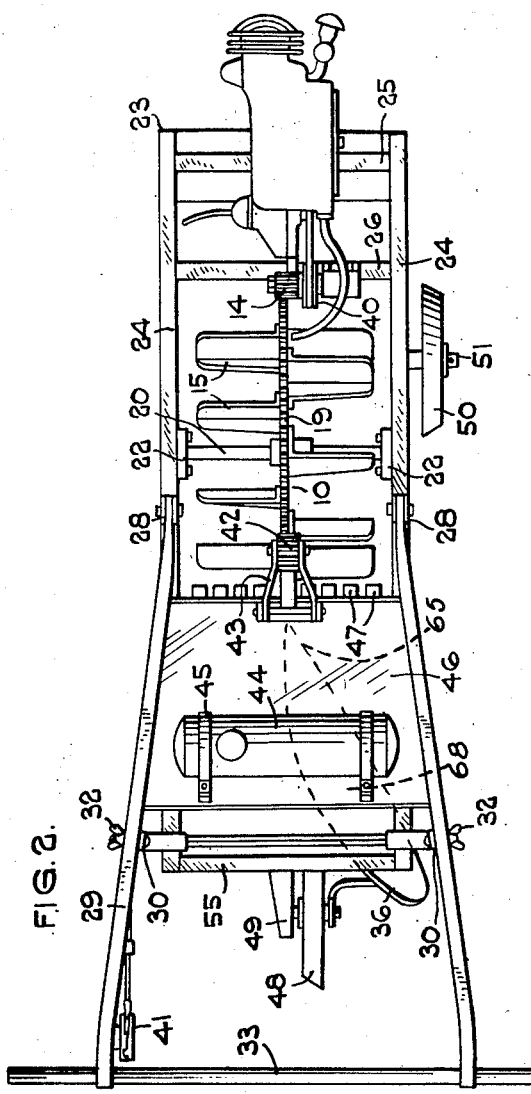
Aug. 4, 1953     S. SMITH     2,647,450
MOTOR-PROPELLED CULTIVATOR
Filed July 23, 1947     5 Sheets-Sheet 2
INVENTOR.
Sydney Smith
BY Otto Munk
HIS ATTORNEY.

Aug. 4, 1953
S. SMITH
2,647,450
MOTOR-PROPELLED CULTIVATOR
Filed July 23, 1947
5 Sheets-Sheet 3
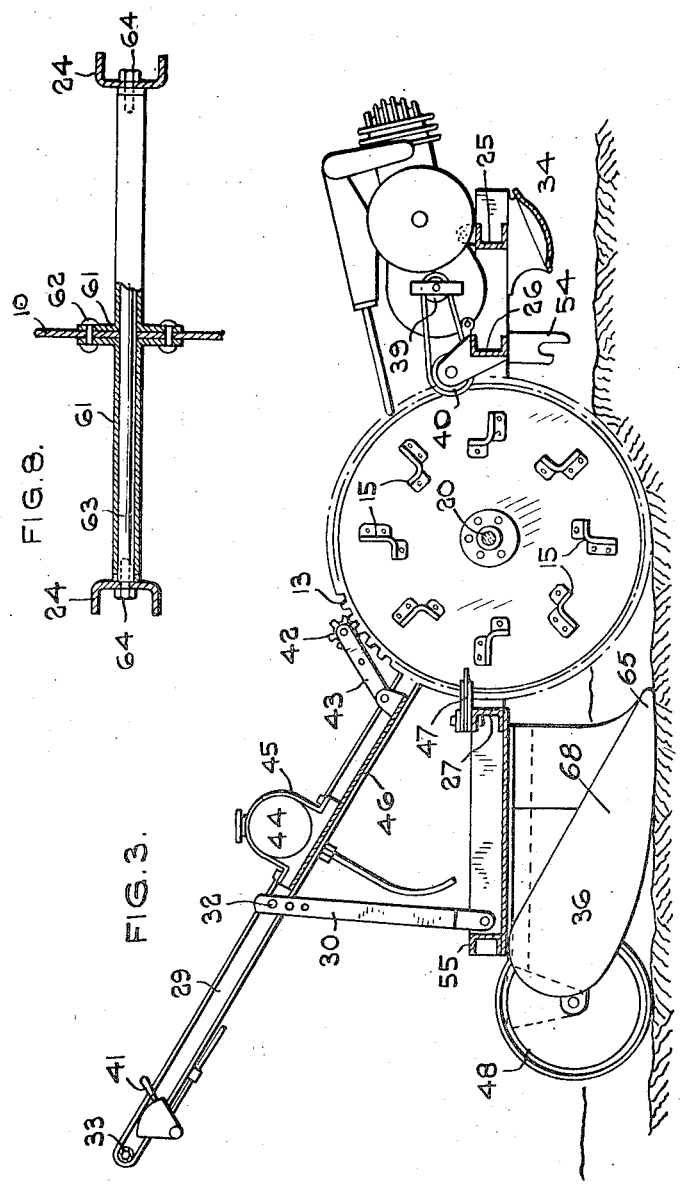
INVENTOR
Sydney Smith
BY Otto Munk
HIS ATTORNEY.

Aug. 4, 1953  S. SMITH  2,647,450
MOTOR-PROPELLED CULTIVATOR
Filed July 23, 1947  5 Sheets-Sheet 4
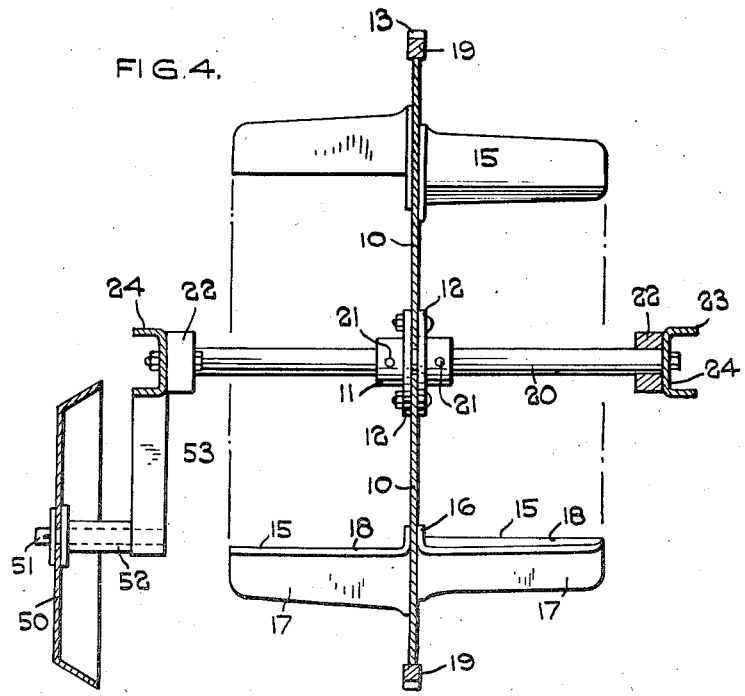
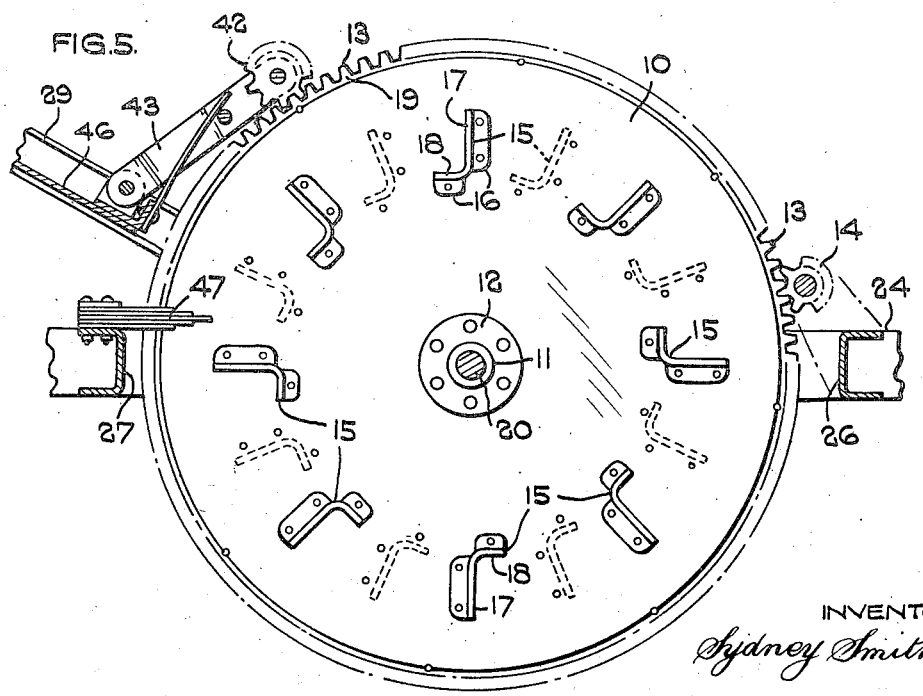
INVENTOR.
Sydney Smith
BY Otto Munk
HIS ATTORNEY.

"Patented Aug. 4, 1953" and "2,647,450" appear at the top.

UNITED STATES PATENT OFFICE 2,647,450

MOTOR-PROPELLED CULTIVATOR

Sydney Smith, Swanage, Dorset, England

Application July 23, 1947, Serial No. 762,964
In Great Britain May 1, 1946

Section 1, Public Law 690, August 8, 1946
Patent expires May 1, 1966

8 Claims. (Cl. 97—47.01)

This invention relates to machines for cultivating land for agricultural and other purposes, which land comprises one or more plots of relatively small area.

The cultivation of such plots, which may, for example, form part or the whole of the garden of a private dwelling or an allotment or market garden or land in a confined space, such as a greenhouse or land encumbered with fences cannot generally be effected by the use of a horse or tractor drawn plough or like implement by reason of the confined space available for turning at the ends of a furrow or the like cultivated track, and furthermore the employment of such relatively expensive equipment is not justified for small areas of land.

One of the chief objects of the invention is to provide a machine of extremely low weight and cost that can be equipped with suitable implements for use in gardens or on small plots of land, and so handy and light and of such simple construction as to be capable of being operated and turned round in a very short distance, with little exertion and very little mechanical knowledge on the part of the operator, and thus form a more rapidly operating motorized alternative to the hand operated spade and fork and other garden implements, thus enabling short spells of fine weather to be taken full advantage of with little or no fatigue compared with digging, and with no overstrain for an elderly man, woman or even a child. Further the construction to be so simplified and the cost of production therefore so low that periods of idleness on the part of the machine are economically permissible, e. g. between the seasons, or on account of the weather or other causes, and on account of the rapidity and ease with which the machine does the work and the saving in time, energy and labour of the operator.

Another important object of the present invention is to provide in a machine of the kind described a driving wheel of new or improved construction which is also adapted to prepare the ground for operating upon by a plough share or other cultivating tools and thus form a multi-purpose unit.

In agricultural machines provided with driving wheels wherein means for engaging in the ground are provided comprising one or more blades extending from the wheel it has hitherto been the practice to mount such blades to project radially from a hub, drum or the like mounting disposed laterally of the main wheel or in some cases the blades may project radially from the circumferential edge of the wheel itself. This arrangement is open to the objection that when the machine is used on ground which is sticky and prone to clogging, the intervening spaces between the blades tend to become clogged with soil, since the presence of a hub or drum or the circumferential edge of the wheel forms an abutment against which the soil can build up.

Another object of my invention is to overcome this disadvantage, by providing means for engaging in the ground comprising blades extending laterally and secured on one or both sides of the wheel of the machine, the arrangement being such that adjacent blades on the same side of the wheel are at a substantial distance apart so that there exists a through passage between adjacent blades which extends radially inwards from the soil penetrating edge of the blades to beyond the inner edge of the blades, whereby soil picked up by the blades will fall away under its own weight, so that the said wheel constitutes in effect a self-cleaning driving wheel.

With the particular object of achieving a simple and light construction I adapt the wheel of the machine to constitute part of the transmission means operating between the power unit and the driving wheel and thus impart to the wheel an extension of the multi-purpose character already referred to. According to this feature of the invention the wheel may be provided at its periphery with gear teeth for engagement with a driving pinion of much smaller diameter so that the wheel is thereby driven through a large reduction ratio without recourse to separate gearing or other drive means on the wheel shaft. An important aspect of this feature of my invention is that where the ground engaging propulsive means such as laterally extending blades are positioned inwardly of the periphery of the wheel the driving wheel diameter to be considered for tractive purposes is correspondingly reduced with corresponding increase in the tractive effort.

A further object of my invention is to provide a self propelled cultivating machine for the purpose set forth, having a driving unit, a power units, a plough share or other cultivating tool disposed rearwardly of the driving unit and a downwardly projecting member beneath the power unit so arranged that in the normal operation of the machine the lower face of said member is spaced from the ground but when the rear end of the machine is raised with the driving wheel clear of the ground the downwardly projecting member may constitute a pivotal support for the machine enabling it to be turned round in a very small space.

In the preferred form a machine constructed in accordance with my invention is provided with one driving wheel of the type hereinbefore described, but it will be understood that I may provide in a cultivating machine two or more such wheels, for example, a pair of wheels carried upon a common axle and spaced apart a sufficient distance to enable the machine to span a row of plants or seedlings and cultivate on both sides thereof.

A further object of my invention is to provide blades forming the ground engaging propulsive means on the wheel constructed to have an outer portion lying in a plane which is radial with respect to the axis of rotation of the wheel and parallel thereto or approximately so and an inner portion lying in a plane which is at right angles to the first said plane and also parallel thereto or approximately so, whereby the last said portion limits the depth of penetration of the blades into the ground.

A further object of my invention is to provide one or more scrapers each comprising a stationary member radially disposed with respect to the wheel axis, the outer end of each member being secured to the body of the machine and the inner end of each member being in close proximity to the soil penetrating edges of the radial portions of the blades so that soil adhering to the blades is scraped off as it occurs and is thus prevented from building up in a radially outward direction through successive revolutions of the wheel.

A further object of my invention is to provide means for removing soil, mud or other foreign matter from the teeth on the main driving wheel before these engage with the driving gear, such means may, for instance, comprise one or more idle gear wheels at least one in pressed engagement with the teeth on the, or each wheel of the machine, whereby the clogging of such teeth by soil is prevented or reduced.

The teeth of one or more of the idle gear wheels may be constructed of rubber so that as the teeth of the gear wheel are pressed into engagement in the spaces between the teeth on the main wheel a squeegee effect is obtained, which contributes towards the cleaning of the teeth of the main wheel.

If the teeth of the idle gear wheel are of rubber a metal bearing of suitable material is provided in the centre, so that the idle gear wheel does not rotate on the rubber.

Alternatively, or if desired in accordance with a further object of my invention I may provide, in addition to the means above described for cleaning the teeth of the main driving wheel, an arrangement wherein the remote end of the exhaust pipe of an internal combustion engine forming the power unit, is directed on to the teeth of the wheel, so that the exhaust gases impinge laterally thereon to assist in removing foreign matter by blowing the particles away. An especial advantage of this arrangement is that the cold teeth of the main wheel will cause condensation of the oil vapour in the exhaust gases which is nearly always present in some degree, and thus provide a certain amount of lubricant for the teeth.

Referring to the drawings:

Figure 1 is a view in side elevation of a cultivating machine constructed in accordance with the invention, with plough attached.

Figure 2 is a view in plan of the same machine.

Figure 3 is a view in side elevation of the same machine with plough attached showing part of the machine in section.

Figure 4 is a view in end elevation of the multi-purpose unit or driving wheel in section, viewed from the front end of the machine showing its mounting in the frame of the machine.

Figure 5 is a view in side elevation of the driving wheel or multi-purpose unit showing the cleaning devices.

Figure 8 is a fragmentary view showing in section an alternative form of mounting for the driving wheel.

Figure 6:
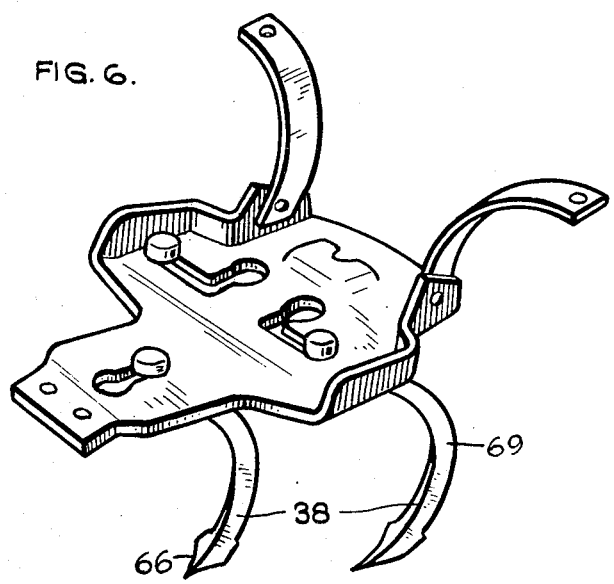
Figures 6 and 7 illustrate other forms of cultivating tools.

The machine comprises the following main parts, a multi-purpose unit or wheel for driving the machine, a body, cultivating tools, a power unit and associated transmission, cleaning devices for the wheel and a carriage for road transport. The construction and details of each of these main parts will be described in the following paragraphs.

The main body of multi-purpose unit or wheel, hereinafter referred to for convenience as a wheel, is formed of a disc 10 having at its centre two hub members 11 secured one on each side of the wheel by nuts and bolts extending through flanges 12 of the hub members, the disc being gripped between the said flanges.

The periphery of the disc is provided with suitable gear teeth 13 for engagement with a driving pinion 14. In a suitable arrangement the disc may be 20½ inches in diameter and have 164 teeth, and the pinion may be provided with 10 teeth, giving a reduction ratio between pinion and disc of approximately 16½ to 1.

On each side of the wheel is provided a number of laterally extending blades 15, conveniently 8 on each side. Each blade may be secured to the disc of the wheel by means of rivets passing through flange portions 16 which lie flat against the disc, and each blade is provided with a radially extending portion 17 for engaging in the ground and a portion 18 at right angles to said radial portion for limiting the depth of penetration of the wheel into the ground.

It is important that the spacing of the blades from each other circumferentially that is to say angularly in relation to the wheel axis, should be such that any soil which tends to adhere to the surface of the blades and bridge the gap between adjacent blades should fall away under its own weight or expelled from between the blades in a subsequent revolution of the wheel and not become consolidated into a solid mass. The area of the radially extending portions of the blades must be sufficiently large to anchor the blades in the ground so that the machine is propelled along, and the areas of the portions 18 must be adequate to limit penetration of the blades into the ground. In one arrangement the following dimensions have been found suitable:

|  | Inches |
|---|---|
| Lateral dimension of the blades | 8 |
| Depth of radial portion | 4 |
| Circumferential dimensions of depth limiting portions 18 | 1 |

A sufficient spacing between adjacent blades is obtained by mounting blades of the above described dimensions with their depth limiting portions 18 lying on a circle of 12 inches diameter.

The variations allow that the depth limiting portions should lie in an annular zone spaced inwardly from the periphery of the disc as defined by circles of about one half and one third the diameter of the disc.

To preserve an unobstructed portion of the disc beyond the blades as shown in the drawings the depth of the radial portions of the blades is preferably confined within a value of two thirds the width of the annular portion of the disc lying between the depth limiting portions of the blades and the periphery of the disc.

It will be understood that the type of soil in which the machine is intended to operate has an important bearing on the dimensions of the radial and depth limiting portions of the blades, and upon the spacing between the blades which it is necessary to preserve to ensure the self-cleaning properties of the type described. The dimensions quoted are intended to be used as a guide and quite wide variations may be made without effecting the correct operations of the wheel.

The disc and the blades may be formed of sheet metal conveniently steel, whilst the teeth 13 at the periphery of the disc may be cut in a separate annular ring 19 secured to the disc; the annular ring being replaceable and of a suitably hardened and toughened steel. The annular ring 19 may be secured so that its lateral faces are flush with the faces of the disc, or project slightly beyond the faces of the disc on each side, securing being effected by means of rivets disposed parallel to the axis of the disc passing through holes; the holes being drilled so that each hole is partly through the disc at its periphery and partly through the inner periphery of the annular ring.

The whole wheel assembly is mounted upon an axle 20 passing through the centre of the hubs 11 and secured thereto by pins 21, the axle turning in bearing blocks 22 located at each end thereof and supported by the frame of the machine.

An alternative method of mounting the wheel assembly is illustrated in Figure 8, wherein tubular flanged members 61 with inwardly disposed flanges secured to the disc of the wheel by means of rivets 62 rotate with the wheel upon a stationary tubular axle 63 extending between the side members of the frame. The stationary axle 63 may be secured to each side member of the frame by means of bolts 64 passing through the side member and screwing into an internally threaded section of the axle provided at each of its ends. The stationary axle 63 therefore acts not only as an axle for the wheel but also as a tie for the two side members to which it is secured, and thus contributes to the rigidity and strength of the machine as a whole.

One part of the body of the machine comprises a horizontal frame structure 23 formed of two side members 24 of channel section sheet steel, secured with the open side of the channel facing outwardly, joined at intervals by cross members 25, 26, 27 and 55 also of channel section sheet steel. The cross members 26 and 27 are arranged in each case so that the open mouth of the channel faces outwardly so that the rectangle enclosed by the two side members 24 and cross members 26 and 27, in which rectangle is located the wheel, has inwardly facing sides having flat surfaces so that there is little or no tendency for soil to adhere to the inner parts of the frame whilst the machine is in use.

The bearing blocks 22 are secured on to each side member 24 of the frame, so that the wheel is journalled on a horizontal axis at right angles to the length of the frame, and when driven propels the machine in a direction parallel to the length of the frame.

Mid-way along each side member 24 is provided an upwardly directed lug 28, to each of which is pivoted a steering shaft 29. The steering shafts 29 extend in an upward and rearward direction and are supported in fixed relation to the frame by means of struts 30. The lower end of each strut is pivoted to the rear end of its corresponding frame member 24 and the upper end of each strut is clamped to the steering shafts by means of clamping bolts 32 passing through the steering shafts.

If desired, I may incorporate adjusting means for altering the angle of the steering shaft so that the height of the rear connecting handle 33 may be varied to suit operators of differing heights. The adjustment may take the form of a number of holes spaced longitudinally along the struts in any one of which clamping bolts 32 may be engaged.

Another part of the body comprises a member used as a pivotal support when abruptly changing the direction of the machine, this part being situated on and secured to the under side of the side members 24 at the forward end of the machine. This pivotal support member has a circular base 34 spaced from the ground when the machine is in the normal operating position and formed as an inverted dome which has a relatively large radius for curvature, and is shallow, so that when used for supporting the machine on soft ground it does not sink into the groud unduly and due to the circular cross section offers no appreciable resistance to the turning round of the machine. The dome portion 34 is secured to the side member 24 of the frame by means of an intermediate wedge shaped part 35, the angle of the wedge being at the forward end so that the dome is directed forwardly as well as downwardly at such an angle that it is horizontal or approximately horizontal when the rear end of the machine is lifted and the load is transferred to the pivotal support and the wheel is clear of the ground during a turning operation, for instance at the end or beginning of a furrow in ploughing. The dome part and the wedge shaped part may, if desired, be formed as a single sheet metal pressing.

A cultivating tool or tools for operating upon the ground are secured to the under side of the frame rearwardly of the wheel, these may take the form of a plough share 36 as shown in Figures 1 and 3 of the machine. Other tools which may be employed include a trenching tool 37 and tines 38, shown as separate illustrations, but other tools such as sub-soilers, or hoeing irons can also be operated from this region.

The power unit comprises a small internal combustion engine supported upon cross members 25, 26 of the frame having a chain and sprocket drive from a sprocket wheel 39 on a shaft projecting from the clutch casing of the engine to a sprocket wheel 40 keyed on to a common shaft with the driving pinion 14. By making the sprocket wheel 39 smaller than the sprocket wheel 40 a further reduction ratio is obtained.

As already stated the ratio between the driving pinion and the disc of the wheel may be approximately 16½ to 1, so that if the additional reduction ratio provided between the sprocket wheel 39 and the sprocket wheel 40 is, for example, 3 to 1, a total reduction of approximately 49 to 1 is achieved. A further important factor is that the diameter of the driving wheel which must be considered for tractive purposes in relation to the ground is that of the effective pitch circle of the blades. This is smaller than the pitch circle of the teeth on the driving wheel and therefore enables in conjunction with the reduction ratio of 49:1 a small inexpensive and light engine to exert the tractive effort required to propel the machine at a comfortable walking pace whilst the speed of the engine is sufficiently high for it to develop a good driving torque and do the work.

For controlling the engine suitable clutch and throttle controls, such as that shown at 41 may be provided on or near the cross handle 33 operated by means of Bowden wires.

The fuel tank 44 for the engine may be supported by means of metal straps 45, secured to a connecting plate 46 joining and stiffening the lower portions of the steering shafts.

To prevent or reduce clogging of the gear teeth 13 at the periphery of the disc a small idle gear wheel or pinion 42 may be provided, maintained in pressure engagement with the teeth 13 by means of a spring loaded link 43, pivoted at its lower end to the plate 46.

In order to prevent the blades and the disc gathering soil, scrapers 47 are secured to the cross member 27 of the frame, extending inwardly towards the centre of the wheel with their ends spaced so that a small clearance exists between the scrapers and the blades as these rotate. The scrapers may each be formed of four or five leaf springs clamped at the secured end to the upper flange member of the channel section cross member 27, so that the outer end of the springs can be deflected somewhat when removing large masses of soil should these be picked up by any part of the wheel.

The action of the scrapers is particularly important in relation to the prevention of the tendency of soil to build up and bridge the gap between adjacent blades. The presence of scrapers ensures that such soil cannot build up in an outward radial direction, and hence the potential bridge between a gap cannot thereby gain in strength, with the result that it might eventually fail to collapse under its own weight or be expelled from between the blades in a subsequent revolution of the wheel.

The plough share 36 shown in Figures 1 to 3 is provided at its rear end with an auxiliary wheel 48 for controlling the depth to which the plough share penetrates the soil. The wheel may be carried by brackets secured to the rear portion of the plough share on one end, on the other side to the upper plate member 49 supporting the plough share assembly.

An outrigger wheel 50 disposed laterally of the main wheel of the machine may be provided to engage in the trough adjacent the furrow which is about to be ploughed by the machine, and so by its lateral spacing, control the width of the ground which is to be turned over by the plough share. The wheel 50 may be supported upon a spindle 52 at the lower end of a bracket 53 secured to one of the side members 24 of the frame. The position of the wheel 50 is such that its axis is approximately 6 inches forward of the centre of the main driving wheel; this arrangement having been found to produce an improvement in steering properties when ploughing.

Figure 7:
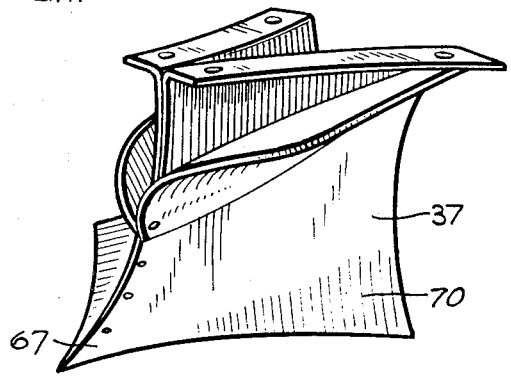

When in operation the main wheel of the machine is driven by the engine, the disc portion of the wheel lying outwardly of the blades cuts into the ground and the blades also successively engage in the ground thereby propelling the machine in a forward direction the disc portion cutting into the ground tending to stabilize the machine in an upright position. The operation of the plough share 36 or other cultivating tool the lower extremity of which lies at substantially the same level as the lower extremity of the annular part of the disc projecting beyond the blades as seen particularly in Figure 1, is facilitated by reason of the prior cutting of the ground longitudinally and laterally by the disc portion of the wheel and by the blades respectively. The annular part of the disc projecting beyond the blades will produce a preformed cut in the ground below the level to which the blades penetrate, the soil on either side of this preformed cut thus remaining undisturbed so that the walls of the cut afford lateral support and location for the leading portions 65, 66 or 67 of the several tools illustrated in Figures 2 and 3, 6 and 7 respectively. The penetration effected by the radially extending portions 17 has the dual purpose of obtaining the necessary traction on the ground to propel the machine along while preparing the often relatively hard surface layer of ground lying laterally of and above said preformed cut for activation by further portions of the tool which are offset laterally from said leading portions and lie in the path of said blades. The activating tool portions are indicated at 68, 69, and 70, respectively in Figures 2 and 3, 6 and 7. At the end of a furrow or other cultivated track the operator of the machine may partly up-end it so that the whole weight rests upon the domed pivotal support member 34 and with the wheels clear of the ground turn the machine to a position in which another ploughing operation can be commenced.

In order to avoid the weight and cost of adjusting devices to enable the plough to commence ploughing the opening furrows, a trenching tool 37 is provided, which is specifically designed to enable the initial sods to be turned. The trenching tool can be used for other purposes such, for instance, as making a celery trench or hoeing up potatoes.

If the ground is particularly hard or of a particularly heavy nature it is preferable when commencing ploughing not to attempt to cut the full depth of trench during one traverse of the ground with the trenching tool, but to make several runs over the same ground deepening the trench by pressing the tool 37 a little more deeply into the ground on each run, or alternatively the ground can be torn to pieces by using one, two or three tines, prior to the use of the trenching tool.

For transporting the machine from one plot to another a carriage comprising a pair of wheels may be provided. The machine itself is provided with downwardly extending lugs 54 secured to the frame forward of the driving wheel, the lower ends of which lugs have open slots for engaging over the axle connecting the wheels of the carriage.

What I claim then is:

1. A cultivating machine for the purpose set forth comprising a body, a power unit, said body being adapted to carry a tool for operating upon the soil, said body being mounted upon a driving wheel disposed forwardly of said tool, driven from said power unit and comprising a disc provided on at least one of its side faces with laterally extending blades and including portions which are substantially radial with respect to the wheel axis for penetrating into the ground to propel the machine along, and portions adapted to limit the depth of said penetration disposed intermediate said radial portions and the centre of the wheel and lying in a plane substantially at right angles to adjacent radial portions, and a member secured at the forward end of the body and projecting downwardly therefrom towards the ground with its lower face spaced from the ground in the normal operation of the machine, whereby said member is adapted to engage the ground and constitute a pivotal support for the machine on raising the rear end of the latter with the driving wheel clear of the ground at least the part of said member which is adapted so to engage with the ground being of substantially circular cross-section so as to facilitate the turning round of the machine.

2. In a cultivating machine for the purpose set forth having, a body, means thereon for supporting a downwardly projecting cultivating tool, and a power unit comprising an internal combustion engine; the combination of a multi-purpose unit comprising, a rotary ground cutting disc journalled in said body in advance of said cultivating tool, said disc having gear teeth at its periphery for engagement with a pinion driven from said power unit, and provided with laterally extending traction blades inset from the periphery of the disc and having depth limiting portions for controlling automatically the depth of cut, with, a combined soil removable and lubrication device, comprising, an exhaust pipe connected to said internal combustion engine and positioned with its end adjacent to and directed laterally towards the periphery of the disc to deliver oil laden exhaust gases laterally against said teeth.

3. In a cultivating machine for the purpose set forth, having a body on which is supported a power unit; the combination of, a multi-purpose unit comprising, a rotary ground cutting disc, journalled in said body, driven from said power unit, and provided with laterally extending traction blades inset from the periphery of the disc, leaving an annular part thereof projecting beyond said blades, and having depth limiting portions inset from the outer ends of the blades for controlling automatically the depth of cut and presenting a rolling surface of diameter less than the cutting edge diameter afforded by the periphery, with, a cultivating tool projecting downwardly from said body and supported thereby rearwardly of said disc, said tool having a leading portion disposed in alignment with said disc which portion has a lower extremity lying substantially at the same level as the lower extremity of said annular part of the disc, whereby said tool is adapted to enter into a preformed cut of which the sides afford lateral support and location for the tool, and said tool having ground activating portions offset laterally from said leading portion and disposed in alignment with said traction blades, whereby said activating portions are adapted to work a ground surface layer already penetrated and prepared by said traction blades.

4. In a cultivating machine for the purpose set forth, having a body on which is supported a power unit; the combination of, a multi-purpose unit comprising a rotary ground cutting disc, journalled in said body, driven from said power unit, and provided with laterally extending traction blades including portions inset from the periphery of the disc leaving an annular part thereof projecting beyond said portions which portions are substantially radial with respect to the disc axis for penetrating into the ground, and including portions adapted to limit the depth of penetration which portions are disposed at respective inner edges of said substantially radial portions and lie in planes substantially at right angles to the latter, and present a rolling surface of diameter less than the cutting edge diameter afforded by the periphery, the depth of said annular part being at least half the depth of said substantially radial portions, with, a cultivating tool projecting downwardly from said body and supported thereby rearwardly of said disc, said tool having a leading portion disposed in alignment with said disc which portion has a lower extremity lying substantially at the same level as the lower extremity of said annular part of the disc, whereby said tool is adapted to enter into a preformed cut of which the sides afford lateral support and location for the tool, and said tool having ground activating portions offset laterally from said leading portion and disposed in alignment with said traction blades, whereby said activating portions are adapted to work a ground surface layer already penetrated and prepared by said traction blades.

5. A multi-purpose traction wheel unit for a cultivating machine, comprising, a rotary ground cutting disc, said disc having gear teeth at its periphery and carrying laterally extending traction blades, said blades including portions inset from the periphery of the disc which portions are substantially radial with respect to the disc axis, and including portions for limiting the depth of wheel penetration lying in planes substantially at right angles to adjacent radial portions and inset from the outer ends thereof to present a rolling surface of diameter less than the cutting edge diameter afforded by the periphery.

6. A multi-purpose traction wheel unit for a cultivating machine, comprising, a rotary ground cutting disc, said disc having secured at its periphery an annular member formed at its outer edge with gear teeth, said disc also carrying laterally extending traction blades, said blades including portions inset from the periphery of the disc which portions are substantially radial with respect to the disc axis, and including portions for limiting the depth of wheel penetration lying in planes substantially at right angles to adjacent radial portions and inset from the outer end thereof to present a rolling surface of diameter less than the cutting edge diameter afforded by the periphery.

7. A multi-purpose traction wheel unit for a cultivating machine, comprising, a rotary ground cutting disc, said disc having gear teeth at its periphery and carrying laterally extending traction blades, said blades including portions inset from the periphery of the disc which portions are substantially radial with respect to the disc axis, and including portions for limiting the depth of wheel penetration lying in planes substantially at right angles to adjacent radial portions and at a distance of between one half and one third the diameter of the disc from the periphery thereof to present a rolling surface of diameter less than the cutting edge diameter afforded by the periphery.

8. A multi-purpose traction wheel unit for a cultivating machine, comprising, a rotary ground cutting disc, said disc having gear teeth at its periphery and carrying laterally extending traction blades, each blade having a portion of L-section with one limb of the L disposed substantially radially with respect to the axis of the disc and the other limb of the L being disposed at right angles thereto and at the inner edge of the first said limb for limiting the depth of penetration of the disc and presenting a rolling surface of diameter less than the cutting edge diameter afforded by the periphery, adjacent depth limiting limbs being spaced apart to leave gaps between them which are greater than their widths measured circumferentially with respect to the disc axis.

SYDNEY SMITH.

References Cited in the file of this patent

UNITED STATES PATENTS

| Number | Name | Date |
|---|---|---|
| 446,292 | Rank | Feb. 10, 1891 |
| 941,422 | Koszegi et al. | Nov. 30, 1909 |
| 1,124,214 | Davis | Jan. 5, 1915 |
| 1,217,729 | Ermatinger | Feb. 27, 1917 |
| 1,322,028 | Lehman et al. | Nov. 18, 1919 |
| 1,325,244 | Galardi et al. | Dec. 16, 1919 |
| 1,327,107 | Lingle | Jan. 6, 1920 |
| 1,419,722 | Dittmar | June 13, 1922 |
| 1,591,187 | Schendel | July 6, 1926 |
| 1,847,280 | Tomlinson | Mar. 1, 1932 |
| 1,865,898 | Glasier | July 5, 1932 |
| 2,108,346 | Paul | Feb. 15, 1938 |
| 2,424,799 | Colombo | July 29, 1947 |

FOREIGN PATENTS

| Number | Country | Date |
|---|---|---|
| 711,915 | France | July 8, 1931 |